March 29, 1938.    E. A. KORVEC    2,112,371
INDICATOR
Filed Nov. 19, 1934    3 Sheets-Sheet 1
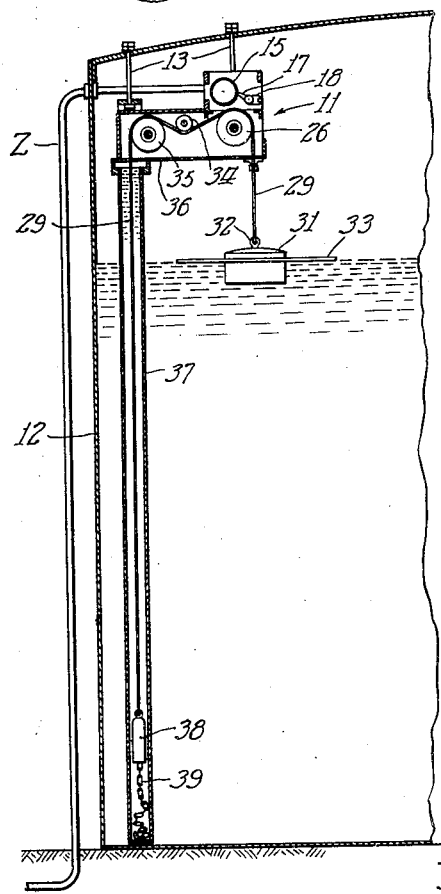
Fig. 1
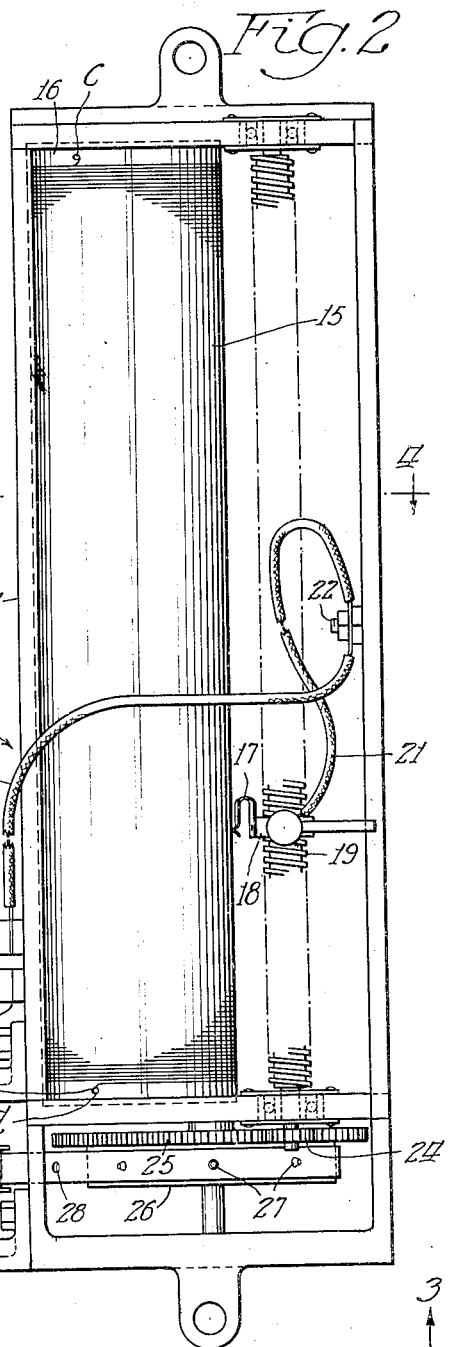
Fig. 2
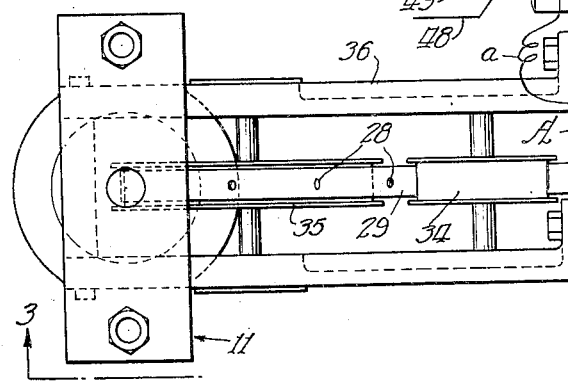
Witness:
V. Sylzander
Inventor
Edward A. Korvec
By: Hill & Hill    Attys.

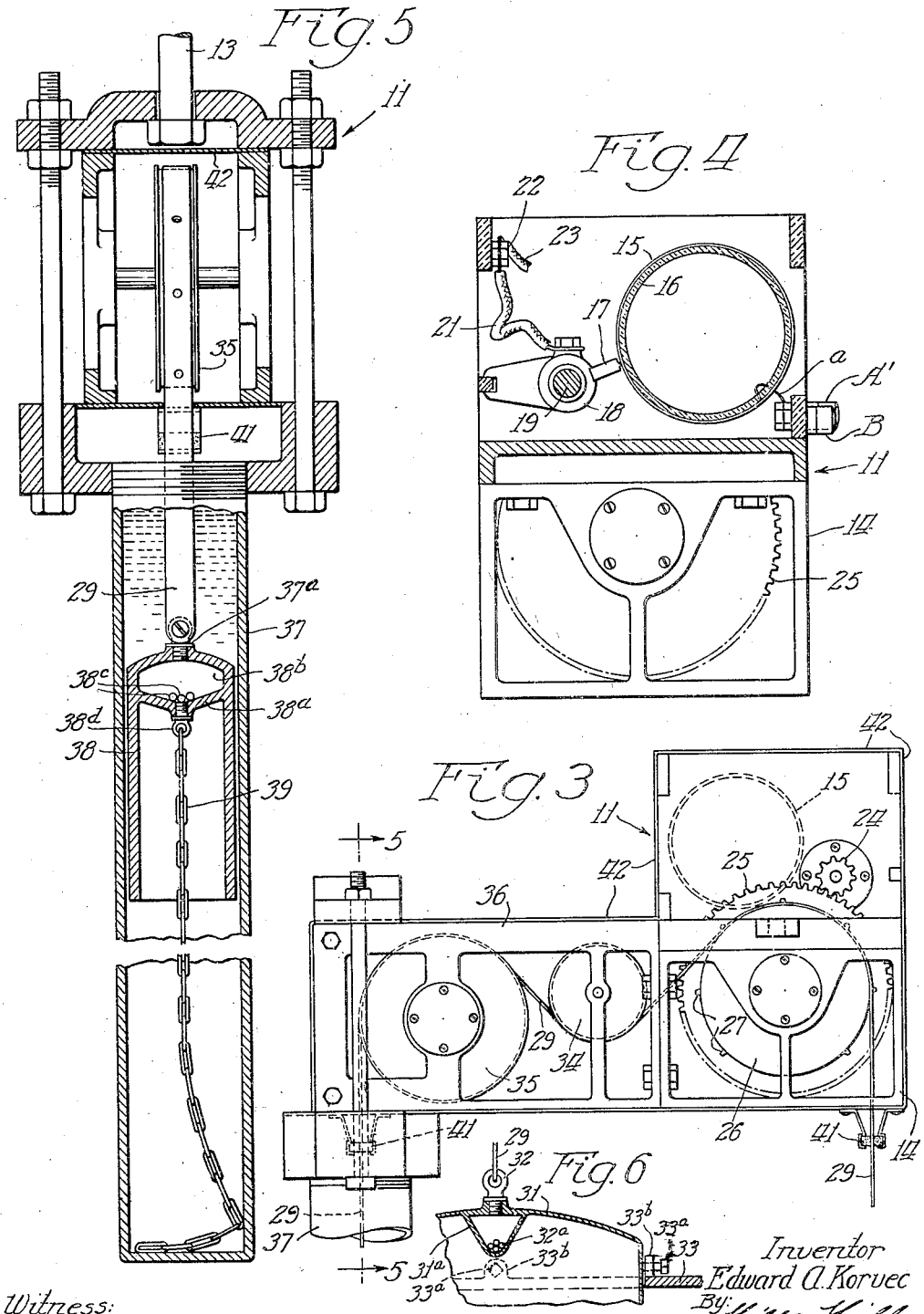

March 29, 1938.                E. A. KORVEC                2,112,371
                                 INDICATOR
                           Filed Nov. 19, 1934          3 Sheets-Sheet 3
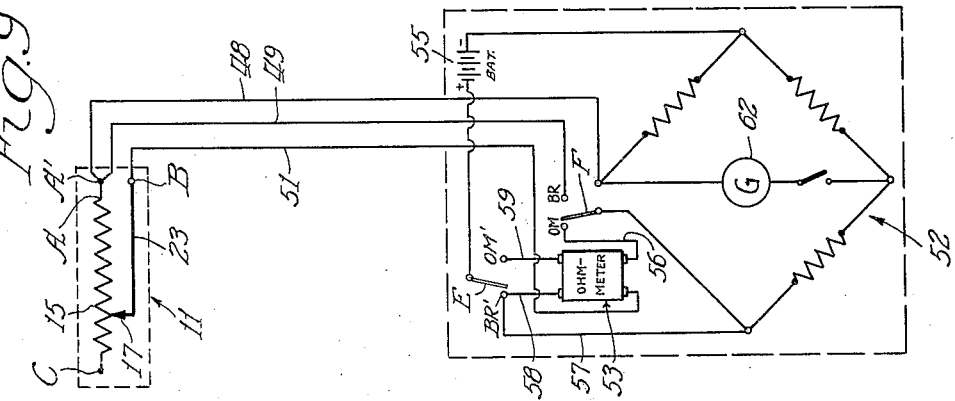
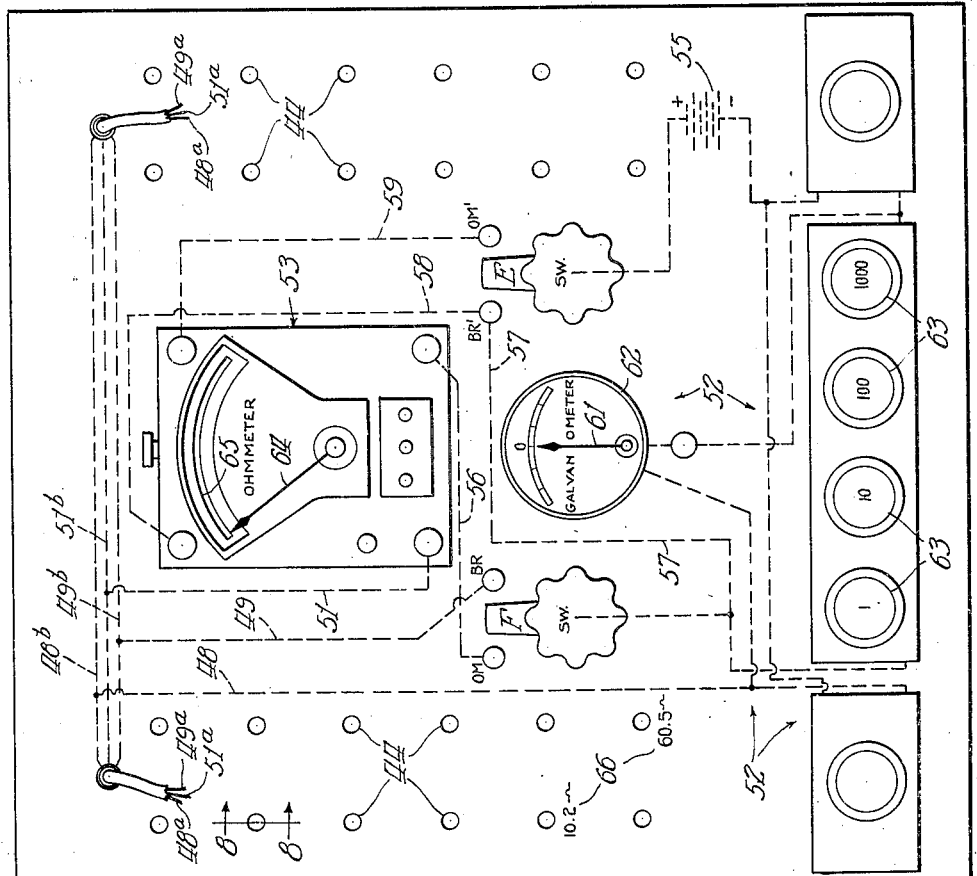
Inventor
Edward A. Korvec
By: Hill & Hill
            Attys Patented Mar. 29, 1938

2,112,371

UNITED STATES PATENT OFFICE 2,112,371

INDICATOR

Edward A. Korvec, Joliet, Ill., assignor of one-half to Leo M. Herkert, Joliet, Ill.

Application November 19, 1934, Serial No. 753,638

5 Claims. (Cl. 201—48)

This invention relates to indicators, and particularly to fluid level indicators for readily ascertaining the quantity of fluid in a tank or other container, and particularly to a device of the character described, whereby such information may be indicated at a point or station remote from the container.

One object of the present invention is to provide a device whereby the quantity of the contents of any one of a plurality of containers may be indicated, through the use of electrical apparatus, at a central station remote from the location of the containers.

Another object of the invention is to provide a novel construction and arrangement wherein the fire hazard, in handling volatile fluids, chemicals, etc., such, for example, as fuel oils and the like, is reduced to a minimum, and the safety of persons employed in handling such fluids is insured.

Another object of the invention is to obtain information concerning the contents of containers, and to provide a device wherein such information is readily ascertainable.

Another object of the invention is to provide means for balancing the line resistance of an electrical circuit extending between a central indicating station and the respective containers, and, through the use of electrical devices controlled by the contents of the containers and connectable in a second circuit, to ascertain the quanity of fluid in the respective containers.

Another object of the invention is to provide a novel construction and arrangement for controlling the operation of an electrical resistance element by means operatively related to a float associated with the fluid in a container.

A further object of the invention is to provide novel counter-balancing means operatively related to a float for obtaining efficient operation of the float-actuated means employed for controlling the operation of the resistance element.

A still further object of the invention is to improve devices of the character described in sundry details hereinafter referred to and particularly pointed out in the appended claims.

One embodiment of the present invention is shown for illustrative purposes in the accompanying drawings, in which:

Fig. 1 is a fragmentary elevational view of a tank or container illustrating a preferred method of mounting a tank unit therein together with operating devices forming a part of the present invention;

Fig. 2 is an enlarged plan view of the tank element illustrated in Fig. 1;

Fig. 3 is an end elevational view of the structure illustrated in Fig. 2, and taken substantially as indicated by the line 3—3 thereof;

Fig. 4 is a transverse elevational view of a portion of the structure illustrated in Fig. 2, and taken substantially as indicated by the line 4—4 thereof.

Fig. 5 is an enlarged sectional elevational view taken substantially as indicated by the line 5—5 of Fig. 3;

Fig. 6 is an enlarged fragmentary sectional view through the upper portion of a float forming a part of the present invention;

Fig. 7 is a front elevational view of a panel board and associated instrumentalities forming a part of the present invention;

Fig. 8 is a diagrammatic elevational view of a jack plug and related contacts forming a part of the panel construction, the view being taken through one of the jack openings of the panel board as indicated by the line 8—8 of Fig. 7; and Fig. 9 is a diagrammatic view of electrical circuits illustrating the relationship of the tank unit and panel board arrangement.

Referring particularly to Figs. 1 to 6, inclusive, the present invention contemplates a tank unit indicated as a whole by the numeral 11 adapted to be mounted, preferably, within and adjacent the upper part of a tank or container 12 by means of supporting bolts 13, the tank unit 11 being shown in the present instance as comprising an elongated frame member 14 having a resistance coil 15 mounted therein, the coil comprising, preferably, a large number of turns of high resistance wire and having one of its ends indicated at A connected by means of a conductor a to a binding post A' mounted on the frame 14, the opposite end of the coil being secured as indicated at C to the core 16 on which the wire is wound.

Operatively related to the resistance coil 15 is a contact finger 17 mounted on a carriage 18 having a lead screw 19 operatively positioned therein and rotatably mounted adjacent its opposite ends in the frame member 14, the relationship of the carriage 18 and lead screw 19 being such that when the lead screw is rotated in either direction, the carriage 18 will be moved longitudinally of the screw in a manner to position the contact finger 17 in engagement with the various turns of the wire comprising the resistance coil 15, the contact finger 17 and carriage 18 being electrically connected through a flexible cable 21 with a binding post 22 on the frame member 14, and thence through an electrical conductor 23 with a binding post B mounted also on the frame 14.

For rotating the lead screw 19 in its bearings, a pinion 24 secured to one end of the screw is adapted to mesh with a gear wheel 25 rotatably mounted in the frame member 14, and mounted to rotate with the gear 25 is a pulley 26 having a plurality of teeth 27 formed on its periphery adapted to engage apertures 28 formed in a flexible driving element shown, in the present instance, as a flat tape 29 having a float indicated, as a whole, by the numeral 31 removably connected to one end thereof by means of a screweye 32 and adapted to be positioned in cooperative relationship with a fluid in the container in a manner to rise and fall with the level of the fluid.

For insuring efficient operative relationship of the float 31 with the fluid of the container, the float, in the present instance, is provided with an adhesion plate 33 of substantial dimensions adapted to rest on the surface of the fluid as illustrated in Fig. 1 of the drawings, and for properly positioning the float 31 and adhesion plate 33 in operative relationship with fluids of different specific gravities, the screw-eye 32 may be screw threaded into the upper portion of the float 31, as shown in Fig. 6, in a manner to be readily removed for the purpose of adding or removing pellets 32a or other weights to or from a pocket-like pellet support 31a formed on the interior of the float 31.

To provide further for the proper positioning of the float 31 and adhesion plate 33 in operative relationship with fluids of different specific gravity, the plate 33 is movably mounted on the float 31 and adapted to be secured thereto in various positions of adjustment with respect to the float by securing means shown, in the present instance, as a plurality of annularly spaced set screws 33a operatively related to ears or lugs 33b mounted on the plate 33 and engageable with the peripheral surface of the float 31, as clearly shown in Fig. 6.

The tape 29, after being trained over the pulley 26 is shown, in the present instance, as extending under a small idle pulley 34 and over a larger idle pulley 35 rotatably mounted in a laterally extending frame portion 36, the opposite or free end of the tape extending downwardly and into an elongated receptacle 37 having an open upper end portion supported in the frame portion 36 and extending downwardly to, preferably, adjacent the bottom of the tank 12.

For counter-balancing and insuring proper and efficient operation of the float 31, the receptacle 37 is intended to contain, preferably, a non-freezable liquid such as gasoline, kerosene, glycerine, or the like, and secured to the free end of the tape 29 by means of a screw-eye 37a and in a manner to be submerged in the non-freezable liquid within the cup-like receptacle 37 is a bell-like member 38 of suitable dimensions to provide a space between its outer surface and the inner surface of the receptacle 37 in a manner to permit the non-freezable liquid in the receptacle 37 to pass the bell-like member 38 as the latter is moved upwardly and downwardly in the receptacle, thereby providing suitable stability in the movements of the float 31.

To compensate for the addition and/or removal of pellets 32a to or from the pocket-like pellet support 31a formed in the float 31, the bell-like member 38 is provided, preferably, on its interior and adjacent its upper end portion with a transverse partition 38a having inwardly inclined floor portions and providing a chamber 38b adapted to receive pellets 38c, which may be inserted in or removed from the chamber 38b through the screw-threaded opening in which the screw-eye 37a is normally positioned.

Suitably connected to the bell-like member 38, preferably within the interior thereof and by means of a screw eye 38d mounted in the partition 38a, is a flexible counter-balancing element shown, in the present instance, as a chain 39 adapted to extend downwardly into the receptacle 37, the chain 39 being of such length as to position and support various portions thereof on the bottom of the receptacle 37 as the float 31 rises and falls with the level of fluid in the container 12, thereby providing a suitable balance between the opposite end portions of the tape and insuring efficient operation of the float 31, and for maintaining the faces of the tape 29 in a clean condition and free from corrosion or the like, suitably arranged wipers 41 are mounted on the frame members adjacent the vertically disposed portions of the tape and in a manner to engage the opposite faces thereof to keep them free of condensation or other foreign matter which might tend to retard the passage of the tape while traveling through the unit.

By such an arrangement, it will be noted that as the float 31 rises and falls with the level of fluid in the container 12, the pulley 26, through its relation with the tape 29 and the gear 25, will be rotated in one direction or another according to the movement of the float, and the pinion 24 and lead screw 19 will be rotated in one direction or another in a manner to position the contact finger 17 in engagement with various turns of the resistance coil 15 to provide more or less resistance in the circuit, presently to be described, and of which various portions of the coil 15 are intended to form a part.

To insure safety in the operation of the device above described, the frame members 14 and 36, coil 15 and its associated elements, may be completely enclosed in an air tight housing by means of cover plates such as indicated at 42 in Fig. 3, it being understood that the contact finger 17 will be in constant engagement with the coil 15, and that the coil and finger 17 will be suitably insulated from the frame members, or, if desired, the frame members may be formed of suitable insulating material such, for example, as Bakelite, fiber, or the like.

As previously mentioned, the present invention is intended to provide a device whereby the contents of any one of a plurality of containers or tanks may be indicated, through the use of electrical apparatus, at a central station remote from the location of the containers, and in this connection, it may be pointed out that such an arrangement is particularly well adapted for use in oil fields, refineries, wholesale fluid dispensing stations and the like, wherein a plurality of tanks may contain various kinds of fluid and from which and to which fluid may, from time to time, be added and/or removed, and wherein an attendant in an office or other central station may at any and all times by use of the present arrangement acquaint himself with the contents of the various containers or tanks, without leaving his position in such office or station.

Referring particularly to Figs. 7, 8, and 9, it will be noted that for obtaining the information desired, the central station or office may be provided with a panel board or instrument panel indicated, as a whole, by the numeral 43, having a plurality of jack openings 44 formed therein, the said openings being provided with suitable contacts 45, 46, and 47 connected, respectively, to line wires or cables 48, 49, and 51 extending, preferably, through a conduit Z between the tank unit 11 and the instrument panel 43, the lines or cables 48, 49, and 51 being formed of like material and of equal length, and consequently having equal line resistance between the tank unit 11 and panel board 43.

By reference to Figs. 2 and 9, it will be noted that the lines 48 and 49 are connected to the binding post A', and the circuit including lines 48 and 49 does not include the resistance coil 15, while the line 51 connects to the binding post B and thence through the conductor 23 and the contact finger 17 with the coil 15.

As illustrated in Figs. 7 and 9, the instrument panel 43 is provided with an indicating and balancing instrument, such, for example, as a Wheatstone bridge, indicated as a whole by the numeral 52, to which the tank unit 11 is connected by means of the line 48, the panel 43 in the present instance being also provided with an ohmmeter or recording instrument, indicated as a whole by the numeral 53, connected to the tank unit at the binding post B by means of the line 51, while the line 49 connected also at one of its ends to the binding post A' terminates at its opposite end in a switch contact indicated at BR.

For connecting the line cables 48, 49, and 51, extending from the tank units positioned at the respective tanks or containers with corresponding cables or lines 48, 49, and 51 in the instrument panel, one or more jack plugs 54 (Fig. 8) is adapted to be positioned in the jack openings 44 in a manner to engage the contacts 45, 46, and 47, the jack plug 54 being provided with flexible conductors 48a, 49a, and 51a adapted to connect with bus bars 48b, 49b, and 51b (Fig. 7) to which the lines 48, 49, and 51 of the panel board are connected.

Operatively related to a source of electrical current, such, for example, as a battery 55 and to the Wheatstone bridge 52 and ohmmeter 53 are a pair of switches E and F, the switch F being adapted for contact with a terminal BR at the panel board end of line 49, and with a terminal OM connected by means of a conductor 56 to the ohmmeter 53, while the switch E is adapted to engage a terminal BR' connected to the Wheatstone bridge by means of a conductor 57 and to the ohmmeter 53 by means of a conductor 58, the switch E being also adapted to engage a terminal OM' connected by means of a conductor 59 with the ohmmeter 53.

It will be observed from the foregoing description of the arrangement shown that when an operator is desirous of ascertaining the quantity of fluid in one or another of the containers or tanks connected with the respective jack openings 44, the jack plug 54 may be positioned in the opening connected to the particular tank, the contents of which is to be determined, then, by moving the switch F into engagement with the terminal BR and the switch E into engagement with the terminal BR', a circuit will be established through the Wheatstone bridge 52, battery 55 and lines or cables 48 and 49, and any resistance in the circuit so established through the lines 48 and 49 will be indicated by a pointer 61 of a galvanometer 62 associated with the bridge, and by adjusting the dials 63 of the bridge 52, the pointer 61 of the galvanometer may be brought to "zero" reading, thereby balancing the circuit embodying the lines 48 and 49. Thereafter, by moving the switch F into engagement with the terminal OM and the switch E into engagement with the terminal OM', a circuit will be established through the Wheatstone bridge, as adjusted, battery 55, ohmmeter 53 and the lines or cables 48 and 51, which circuit also includes the flexible connector 23, contact finger 17 and that portion of the coil 15 between the contact finger 17 and the binding post A'. It will be observed that by such an arrangement, and owing to the fact that the cables 48, 49, and 51 are formed of like material and of equal length and, therefore, being of equal resistance, any resistance added to the circuit 48-51 by reason of the coil 15, will be indicated by a finger 64 of the ohmmeter 53 according to the position of the contact finger 17 with reference to the coil, or, in other words, will indicate the position of the float 31 in the tank 12, by the movement of which, the contact finger 17 is variously positioned with reference to the coil to include more or less of the coil 15 in the circuit 48-51, according to the quantity of fluid in the tank, and by proper calibration of the ohmmeter and resistance coil 15 with reference to the position of the float, the level of the fluid in the tank or quantity thereof, may be determined by the resistance indicated on the scale 65 of the ohmmeter by the indicator finger 64.

If desired, the line resistance of the various sets of cables 48, 49, and 51 leading to the various tanks or containers may be designated or marked on the instrument panel at the jack openings related to the respective tanks, as indicated at 66 in Fig. 7, and any balancing of the circuit necessary may be accomplished by adjusting the dials 63 of the Wheatstone bridge.

It will be noted by reference to Figs. 2 and 3, that with the pitch of the threads on the lead screw 19, as shown in Fig. 2, a rise in the level of fluid in the container 12 will move the contact finger 17 along the coil 15 in a direction to add resistance to the circuit 48-51, but if found desirable to cut out resistance of the coil as the fluid in the tank rises, the end portion C of the coil may be connected to the binding post A' instead of the end portion A of the coil, as shown in the drawings.

It will be observed from the foregoing description that the present invention provides a novel construction and arrangement whereby the contents of a plurality of containers may be readily and conveniently ascertained at a central station remote from the location of the containers, and wherein the fire hazard attendant upon the handling of volatile liquids is reduced to a minimum and the safety of persons employed in handling such liquids is insured.

Obviously, the present invention is not limited to the precise construction and arrangement shown and described, as the same may be variously modified. Moreover, all the features of the invention need not be used conjointly as the same may be used to advantage in variously different combinations and subcombinations.

What I claim as new and desire to secure by Letters Patent is:

1. In a fluid level indicator, a frame adapted to be positioned in a fluid container, an electrical resistance coil mounted in said frame, a lead screw rotatably mounted in said frame and extending substantially parallel to said coil, a contact finger mounted on said screw and operatively related to said coil, a toothed pulley rotatably mounted in said frame and operatively related to said screw for rotating the screw in opposite directions, a tape having teeth-receiving apertures trained over said pulley, a float secured to one end of said tape and having an adhesion plate adjustably mounted on said float and operatively related to the fluid in the said container, and a balancing chain operatively related to the opposite end of said tape.

2. In a fluid level indicator, a frame adapted to be positioned in a fluid container, an electrical resistance coil mounted in said frame, a lead screw rotatably mounted in said frame and extending substantially parallel to said coil, a contact finger mounted on said screw and operatively related to said coil, a pulley rotatably mounted in said frame and operatively related to said screw for rotating the screw in opposite directions, a tape trained over said pulley, a float removably secured to one end of said tape and having an adhesion plate operatively related to the fluid in said container, a receptacle mounted in said frame, and a balancing chain in said receptacle operatively related to the opposite end of said tape.

3. In a fluid level indicator, a frame adapted to be positioned in a fluid container, an electrical resistance coil mounted in said frame, a lead screw rotatably mounted in said frame and extending substantially parallel to said coil, a contact finger mounted on said screw and operatively related to said coil, a pulley rotatably mounted in said frame and operatively related to said screw for rotating the screw in opposite directions, a tape trained over said pulley, a float secured to one end of said tape and operatively related to the fluid in said container, a receptacle mounted in said frame, said receptacle being adapted to contain a non-freezable liquid therein, a bell-like member secured to the opposite end of said tape, and a balancing chain connected to said bell-like member and suspended therefrom within said receptacle.

4. In a fluid level indicator, a frame adapted to be positioned in a fluid container, an electrical resistance coil mounted in said frame, a lead screw rotatably mounted in said frame and extending substantially parallel to said coil, a contact finger mounted on said screw and operatively related to said coil, a pulley rotatably mounted in said frame and operatively related to said screw for rotating the screw in opposite directions, a tape trained over said pulley, a float secured to one end of said tape and operatively related to the fluid in said container, a receptacle mounted in said frame and adapted to extend into the container, said receptacle having a non-freezable liquid therein, a bell-like member having a chamber therein removably secured to the opposite end of said tape and vertically movable in said receptacle and the liquid therein, and a balancing chain connected to said bell-like member and suspended from within the interior thereof and within said receptacle.

5. In a fluid level indicator, a frame adapted to be mounted on a fluid container, an electrical resistance coil mounted in said frame, a lead screw rotatably mounted in said frame and extending substantially parallel to said coil, a contact finger mounted on said screw and operatively related to said coil, a pulley rotatably mounted in said frame and operatively related to said screw for rotating the screw in opposite directions, a tape trained over said pulley, a float removably secured to one end of said tape and having an adhesion plate operatively related to the fluid in said container, an elongated receptacle mounted in said frame and having a non-freezable liquid therein, a bell-like member secured to the opposite end of said tape and vertically movable in said receptacle and the liquid therein, a balancing chain connected to and extending from within said bell-like member into said receptacle, and a plurality of wipers mounted on said frame and operatively related to the respective faces of said tape.

EDWARD A. KORVEC.